United States Patent
Reik et al.

[11] Patent Number: 5,950,780
[45] Date of Patent: Sep. 14, 1999

[54] METHOD OF AND APPARATUS FOR OPERATING A TRANSMISSION

[75] Inventors: Wolfgang Reik; Norbert Esly; Robert Fischer, all of Bühl, Germany

[73] Assignee: LuK Getriebe-Systeme GmbH, Buhl, Germany

[21] Appl. No.: 09/032,651

[22] Filed: Feb. 27, 1998

[30] Foreign Application Priority Data

Feb. 27, 1997 [DE] Germany ............................ 197 07 867

[51] Int. Cl.[6] ............................ B60K 41/22; B60K 20/00; F16H 27/02
[52] U.S. Cl. ...................... 192/3.56; 192/3.57; 192/3.58; 192/3.61; 192/3.63; 74/473.1; 74/128
[58] Field of Search .................... 192/3.56, 3.57, 192/3.58, 3.61, 3.63; 74/335, 473.25, 473.24, 473.26, 473.1, 128

[56] References Cited

U.S. PATENT DOCUMENTS

| | | | |
|---|---|---|---|
| 2,683,376 | 7/1954 | McCloy | 74/128 |
| 2,753,025 | 7/1956 | Reis | 192/3.57 |
| 2,956,444 | 10/1960 | Bensinger et al. | 192/3.56 |
| 4,096,761 | 6/1978 | Brown | 74/128 |
| 4,280,604 | 7/1981 | Lambicco | 192/3.58 X |
| 5,377,797 | 1/1995 | Mustapha et al. | 192/3.63 X |
| 5,456,634 | 10/1995 | Maucher et al. | . |
| 5,507,373 | 4/1996 | Nguyen | 192/3.58 |

Primary Examiner—Charles A. Marmor
Assistant Examiner—Roger Pang
Attorney, Agent, or Firm—Darby & Darby

[57] ABSTRACT

The power train of a motor vehicle employs an automated transmission and an automated clutch between the transmission and the combustion engine. The clutch is automatically disengaged prior to, and is automatically reengaged after, each selection of a particular gear of the transmission. A common first actuator (such as a reversible stepping motor) is employed to select the condition of the clutch and to select various gears, and a second actuator is used to effect actual shifting of the transmission into or from a selected gear. The connection between the first actuator and a clutch operating member comprises a reciprocable or rotary first cam, and the connection between the first actuator and a gear selecting member comprises a preferably rotary second cam which receives motion from the first cam.

20 Claims, 5 Drawing Sheets

METHOD OF AND APPARATUS FOR OPERATING A TRANSMISSION

BACKGROUND OF THE INVENTION

The present invention relates to improvements in power trains for use in motor vehicles and to improvements in methods of operating clutches and transmissions in such power trains.

Automation of heretofore manually performed gear selecting, gear shifting and clutch engaging/disengaging operations is gaining in importance and popularity by the operators of motor vehicles. An advantage of automated power trains which do not employ a torque converter is their lower cost, a higher efficiency and the resulting reduction of fuel consumption.

A drawback of presently known power trains with automated torque transmitting systems (such as friction clutches) and automated change-speed transmissions is that they must employ more than two actuators (such as electric or hydraulic motors), namely a first actuator which serves to select the condition of an engageable and disengageable clutch normally operating between the prime mover and the transmission of the power train (the clutch must be disengaged during shifting of the transmission into a selected gear); a second actuator which operates the gear selecting means of the transmission (such gear selecting means serves to select one of several paths for movements of a device which actually shifts the transmission into and out of a selected gear); and a third actuator for the gear shifting device. A transmission wherein the selection of gears and the shifting into and from selected gears involve the utilization of two discrete actuators can comprise a shaft which is movable axially by a first actuator to thus select one of a plurality of different gears and which is turnable by a second actuator to thus shift the transmission into or from a selected gear. It is also possible to reverse the functions of the first and second actuators, i.e., the first actuator can move the shaft axially to shift the transmission into and from a selected gear, and the second actuator can turn the shaft in order to select any one of a plurality of different gears.

Each of the three actuators must receive signals from at least one control circuit to operate in accordance with a predetermined program. Such control circuits (each of which can employ or cooperate with several sensors) contribute to the bulk and cost of the power train and render the power train prone to malfunctioning.

OBJECTS OF THE INVENTION

An object of the invention is to provide a power train which employs an automated change-speed transmission and an automated torque transmission system (such as a friction clutch), and is simpler, less expensive and more reliable than heretofore known power trains of such character.

Another object of the invention is to provide novel and improved controls for the automated change-speed transmission and the automated torque transmission system (hereinafter called clutch or friction clutch for short) in the power train of a motor vehicle.

A further object of the invention is to provide a novel and improved method of operating a power train which embodies an automated clutch and an automated transmission.

An additional object of the invention is to provide a motor vehicle (such as a passenger car or a truck) which employs the above outlined power train.

Still another object of the invention is to reduce the number of actuators in, and to thus reduce the cost of, a power train with an automated clutch and an automated transmission without adversely affecting the quality, the useful life and/or the reliability of the improved power train.

A further object of the invention is to provide a novel and improved operative connection between an actuator and selected constituents of an automated transmission and an automated clutch in the power train of a motor vehicle.

SUMMARY OF THE INVENTION

One feature of the invention resides in the provision of a power train which can be utilized in a motor vehicle and comprises an automated variable-speed transmission shiftable into a plurality of different gears (such as, for example, a neutral gear, a reverse gear and several forward gears) and having mobile means for selecting the gears as well as mobile means for shifting into and from selected gears. The power train further comprises a prime mover (such as an internal combustion engine) and an automated clutch which operates between the prime mover and an input element of the automated transmission and has engaged and disengaged conditions. The clutch comprises mobile operating means for selecting its condition and the power train further comprises regulating means for initiating and controlling the movements of the aforementioned gear selecting, gear shifting and clutch operating means. The regulating means comprises a first actuator (e.g., an electric, fluid-operated or other suitable motor) for the gear shifting means, a second actuator (e.g., a reversible electric stepping motor) which is common to the gear selecting and clutch operating means, and means for transmitting motion from the second actuator to the gear selecting and clutch operating means. The motion transmitting means is movable from a first position to thus disengage the clutch by way of the operating means, through an intermediate position to thus move the gear selecting means, and to a second position to thus engage the clutch by way of the operating means. In accordance with a feature of the invention, the motion transmitting means comprises a preferably essentially endless cam and the gear selecting means has follower means arranged to track a selected cam face or selected cam faces of the preferably endless cam.

The motion transmitting means can further comprise a second cam which is movable along a predetermined path from the first position to thus disengage the clutch by way of the operating means, through the intermediate position to thus effect a movement of the gear selecting means by way of the preferably endless cam, and to the second position to thus engage the clutch. The second position of the second cam can at least substantially coincide with the first position; this can be readily accomplished, for example, by mounting the second cam for movement relative to the preferably endless cam from the first position as well as from the intermediate position to the second position. The condition of the clutch preferably remains or can remain unchanged during movement of the second cam through the intermediate position.

The movements of the second cam from the first position and through the intermediate position can take place in a first direction, and the movement of the second cam to the second position can take place in a second direction at least substantially counter to the first direction. For example, the second cam can comprise a ramp and the operating means for the automated clutch can comprise a follower (such as a roller follower) which tracks the ramp during movements of the second cam from the first position and from the intermediate position to the second position.

The motion transmitting means preferably further comprises means for coupling the preferably endless cam to the second cam during movement of the second cam through the intermediate position. For example, the cam faces of the preferably endless cam can comprise a plurality of first cam faces and a plurality of second cam faces, and the coupling means cooperates with the first cam faces to move the preferably endless cam during movement of the second cam through the intermediate position. The follower means of the gear selecting means tracks the second cam faces to move the gear selecting means for the purpose of selecting a gear during movement of the second cam through the intermediate position. The preferably endless cam can comprise a first substantially sawtooth shaped portion which is provided with the first cam faces, and a second substantially sawtooth shaped portion provided with the second cam faces.

The coupling means can comprise a spring-biased pawl which is mounted on the second cam and has a pallet adapted to entrain the preferably endless cam in one direction but to ride over the respective sawtoothed portion of the preferably endless cam during movement of the second cam in the opposite direction.

The arrangement can be such that the shifting of the transmission into any one of the plurality of different gears necessitates movements of the gear selecting means to several positions, and each of the second cam faces can be dimensioned and configured to effect a movement of the follower means through distances which are sufficient to move the gear selecting means to any one of the several positions.

The movements of the gear selecting means to several positions can necessitate movements through predetermined distances, and the first cam faces can be dimensioned and configured to effect a movement of the gear selecting means through fractions of such predetermined distances.

The operating means can further comprise a stop which serves to limit the movements of the preferably endless cam to movements in one of the two directions.

The aforementioned pawl of the coupling means can be mounted on a slide or carriage which is movable with and relative to the second cam.

The second actuator can be arranged to move the gear selecting means to a position corresponding to the selection of any one of the plurality of different gears from a previously selected gear to an adjoining gear during movement of the motion transmitting means through the intermediate position.

The second actuator can be arranged to move the gear selecting means to a position corresponding to the selection of any one of a plurality of different gears during movement of the motion transmitting means through the intermediate position.

As already mentioned above, at least one of the actuators can comprise an electric motor (such as a stepping motor) or a fluid-operated motor (e.g., a hydraulic cylinder and piston unit).

Another feature of the invention resides in the provision of a method of operating an automated clutch and an automated transmission in a power train wherein the transmission is shiftable into and from a plurality of different gears and has mobile means for selecting the gears and mobile means for shifting into and from selected gears, wherein the transmission receives torque from a prime mover by way of the clutch and the clutch has engaged and disengaged conditions and includes mobile operating mans for selecting the required condition, and wherein a regulating means serves to initiate and control the movements of the gear selecting, gear shifting and clutch operating means and has a first actuator for the gear shifting means, a second actuator for the gear selecting and clutch operating means, and means for transmitting motion from the second actuator to the gear selecting and clutch operating means. The method comprises the steps of disengaging the clutch by way of the second actuator and the motion transmitting means prior to each selection of a gear by the second actuator and the motion transmitting means, engaging the clutch by way of the second actuator and the operating means upon each selection of a gear by the second actuator and the motion transmitting means, shifting the transmission into a selected gear by way of the first actuator and the gear shifting means, and providing the regulating means with at least one preferably essentially endless cam for carrying out a gear selecting operation.

The selection of any one of the different gears can involve movements of the gear selecting means through predetermined distances between a plurality of different positions each of which denotes a selection of a particular one of the plurality of gears, and each selection of a gear by the second actuator and the motion transmitting means can include moving the selecting means through one of the predetermined distances between successive movements of the operating means. Alternatively, each selection of a gear by the second actuator and the motion transmitting means can include moving the gear selecting means through a multiple of one of the predetermined distances between successive movements of the operating means.

The novel features which are considered as characteristic of the invention are set forth in particular in the appended claims. The improved power train itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
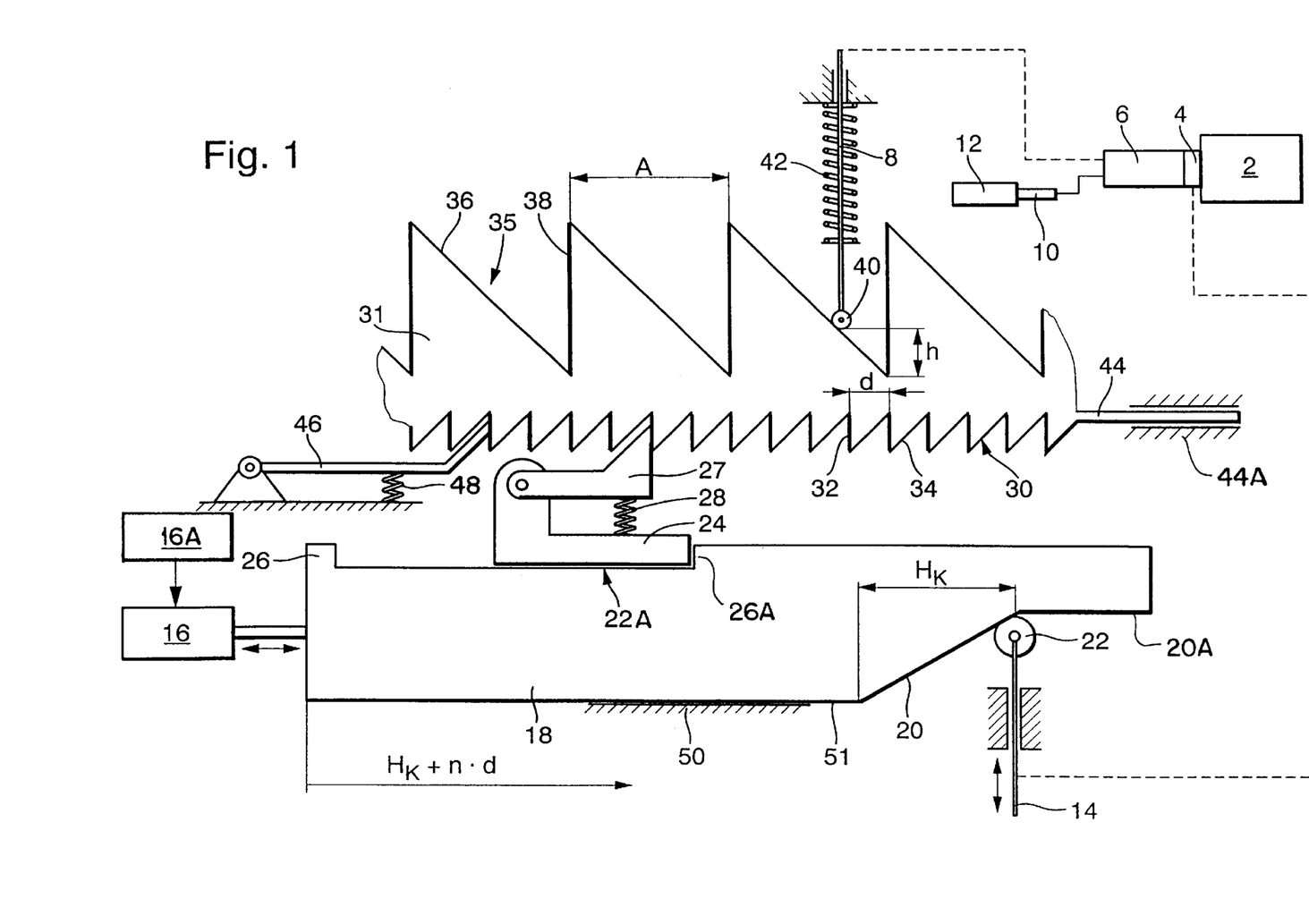
FIG. 1 is a schematic partly elevational and partly sectional view of a power train which embodies one form of the invention.

FIG. 1 shows a power train which can be utilized in a motor vehicle and comprises a prime mover 2 (e.g., an internal combustion engine), an automated transmission 6, and an automated torque transmission system 4 (such as a friction clutch and hereinafter referred to as clutch or friction clutch for short) which serves to transmit torque from an output element (such as a camshaft or a crankshaft) of the prime mover 2 to an input element of the transmission 6.

The transmission 6 is shiftable into any one of a plurality of different gears, such as a neutral gear, a reverse gear and several (e.g., four or five) forward gears. A mobile gear selecting member 8 of the transmission 6 can be actuated by a regulating unit to select a particular gear while a mobile gear shifting member 10 of the transmission is maintained in a neutral position. The means for moving the gear shifting member 10 in order to shift the transmission 6 into or from a selected gear comprises a first actuator 12.

The gear selecting member 8 can be of one piece with the gear shifting member. For example, such members can constitute a shaft or rod which is movable axially to select a particular gear and which is turnable to shift into or from a selected gear (or vice versa). A presently preferred transmission employs a shaft or rod which can be moved axially between several positions to select a particular gear, and which can be caused to turn clockwise or counterclockwise in a selected axial position to thus shift the transmission 6 into or from a particular gear. The actuator 12 then serves to turn the member 10 in clockwise and clockwise directions or in a single direction.

The condition of the clutch 4 can be selected by an operating member 14 which can effect a full engagement, a partial engagement, or a full disengagement of the clutch. For example, the operating member 14 can include a bearing which is movable axially to change the inclination of a tiltable diaphragm spring in the housing of the clutch 4 whereby the diaphragm spring causes a pressure plate to engage or to become at least partially disengaged from a rotary clutch disc or clutch plate which is installed on and can rotate the aforementioned rotary input element (e.g., a shaft) of the transmission 6. Such clutches are disclosed, for example, in commonly owned U.S. Pat. No. 5,456,634 granted Oct. 10, 1995 to Paul Maucher et al. for "TORSION DAMPING APPARATUS FOR USE WITH FRICTION CLUTCHES IN THE POWER TRAINS OF MOTOR VEHICLES". The disclosure of this patent is incorporated herein by reference.

Figure 4:
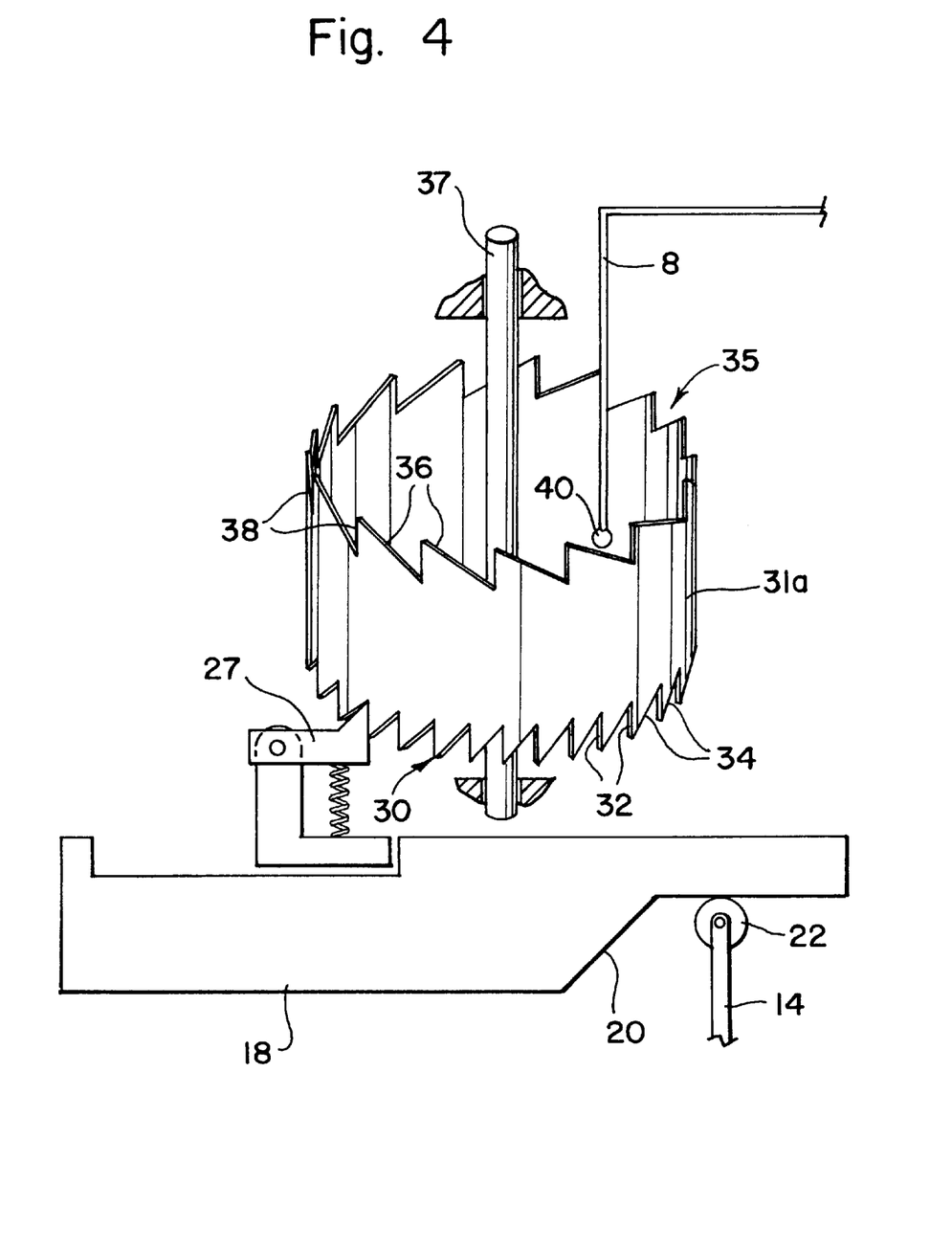
FIG. 4 is a diagrammatic partly perspective view of a third power train which embodies the invention.

The means for moving the gear selecting member 8 and the clutch operating member 14 comprises a second actuator 16 (such as a fluid-operated motor or an electric motor, e.g., a stepping motor) and a motion transmitting arrangement including a first cam 18 and a second cam 31a (FIG. 4). The actuator 12 is optional, i.e., the actuator 16 can be utilized to transmit motion to the gear selecting member 8 and to the gear shifting member 10 of the transmission 6, as well as to the operating (engaging/disengaging) member 14 of the automated clutch 4.

The actuator 16 is responsive to signals from an electronic control unit 16A with a microprocessor and a memory. Such signals can induce the actuator 16 to move the reciprocable cam 18 of the motion transmitting arrangement including the cams 18, 31a relative to a suitable guide 50. The cam 18 is designed to perform a first movement (from the starting position of FIG. 1 and in a direction to the right) through a distance Hk whereby a roller follower 22 of the clutch operating member 14 tracks a ramp 20 of the cam 18 in a sense to disengage the clutch 4 through the medium of the mobile operating member 14. A further movement of the cam through an intermediate position (in which the follower 22 tracks a non-inclined face 51 of the cam 18) is carried out for the purpose of selecting (by the mobile member 8 in cooperation with the cam 31a) a desired gear of the transmission 6 while the clutch 4 remains in the disengaged condition, and such movement of the cam 18 is followed by a movement to a second position which preferably coincides with the first position shown in FIG. 1. In other words, the actuator 16 then moves the cam 18 in a direction to the left (as viewed in FIG. 1) so that the follower 22 first tracks the face 51 and thereupon the ramp 20 with the result that the clutch 4 is reengaged upon completion of a selection of a desired gear by the member 8 and the shifting of the transmission 6 into such selected gear by the actuator 12 and mobile shifting member 10.

It will be seen that a complete cycle of the reciprocable cam 18 involves a movement from the first position of FIG. 1 through the distance Hk (the effective length of the ramp 20), thereupon through an intermediate position through a distance n.d (wherein d is the distance required by the cam 31a to move a follower 40 of the gear selecting member 8 between two positions corresponding to the distance to be covered by the member 8 between two neighboring gears of the transmission 6), and thereupon in a direction to the left through a distance n.d+Hk in order to move the cam 18 to the second position coinciding (in the embodiment of FIG. 1) with the first position shown in FIG. 1. This causes the follower 22 to track the ramp 20, to thereupon track the cam face 51, and to ultimately track the cam face 51 and the ramp 20.

As already mentioned above, the clutch 4 is fully or substantially fully disengaged by the operating member 14 (such as the piston rod of a fluid-operated cylinder and piston assembly) when the follower 22 tracks the face 51 of the cam 18.

FIG. 1 shows a ramp 20 having a constant inclination all the way between the cam face 51 and a further cam face 20A of the cam 18. However, the illustrated cam 18 can be replaced with a cam having a ramp (replacing the straight ramp 20) having a median portion exhibiting a first inclination relative to the cam face 51 and two marginal portions (adjacent the cam faces 51 and 20A) at least one of which has a greater or lesser second inclination relative to the cam face 51.

It is also possible to replace the reciprocable cam 18 with a rotary cam having a composite peripheral cam face including a cylindrical portion corresponding to the straight cam face 51 of the cam 18 and at least one non-cylindrical portion corresponding to the ramp 20. If a cylindrical cam has a peripheral groove for the follower 22, such groove is configurated to ensure that the follower 22 performs movements analogous to those described by the follower 22 relative to the cam 18 of FIG. 1 in order to disengage the clutch 4 prior to movement of the gear shifting member 8, to thereupon move the member 8 via cam 31a (or an equivalent cam) while the clutch is fully disengaged, and to reengage the clutch upon completion of the selection of a desired gear and shifting (by member 10 and actuator 12) into the desired gear.

That side of the reciprocable cam 18 of FIG. 1 which is located opposite the cam face 51 is provided with a guide surface 22A parallel to the cam face 51 and serving to guide a slide or carriage 24 movable relative to the cam 18 between a first stop 26 and a second stop 26A. The cam 18 can move relative to the carriage 24 (which is assumed to abut or to be adjacent the stop 26A) through the distance Hk during movement from the first position shown in FIG. 1. Such movement of the cam 18 relative to the carriage 24 is terminated when the clutch 4 is disengaged by the operating member 14 because the carriage 24 is then entrained by the stop 26 to share the next stage of movement of the cam 18 from the position of FIG. 1 (the follower 22 then tracks the cam face 51 and the clutch 4 is disengaged).

The carriage 24 pivotably supports a pawl 27 which is biased by a spring 28 so that its pallet engages the adjacent sawtooth shaped portion 30 of the cam 31a. The portion 30 has a row of teeth with cam faces 32, 34. The cam faces 32 are at least substantially normal to the directions of movement of the carriage 24 and cam 18. It will be seen that the pallet of the pawl 27 bears against one of the cam faces 32 and turns the cam 31a in a direction to the right, as viewed in FIG. 1 (i.e., in a counterclockwise direction, as viewed in FIG. 4) when the carriage 24 is pushed by the stop 26 of the cam 18, i.e., while the face 51 of the cam 18 moves along the follower 22 so that the operating member 14 maintains the clutch 4 in the fully disengaged condition. The pallet of the pawl 27 ratchets over the teeth of the portion 30 (i.e., it slides along the cam faces 34) when the cam 18 is caused to move in a direction to the left and the carriage 24 is pushed by the stop 26A.

The cam 31a comprises a second sawtooth shaped portion 35 which is located opposite the portion 30 and includes alternating cam faces 36, 38. Such cam faces are tracked by the roller follower 40 which is provided on the gear selecting member 8 and is biased against the portion 35 by a suitable resilient element 42. The spacing or distance A between the cam faces 38 is several times the distance d between the cam faces 32, preferably a whole multiple of distance d.

Figure 1A:
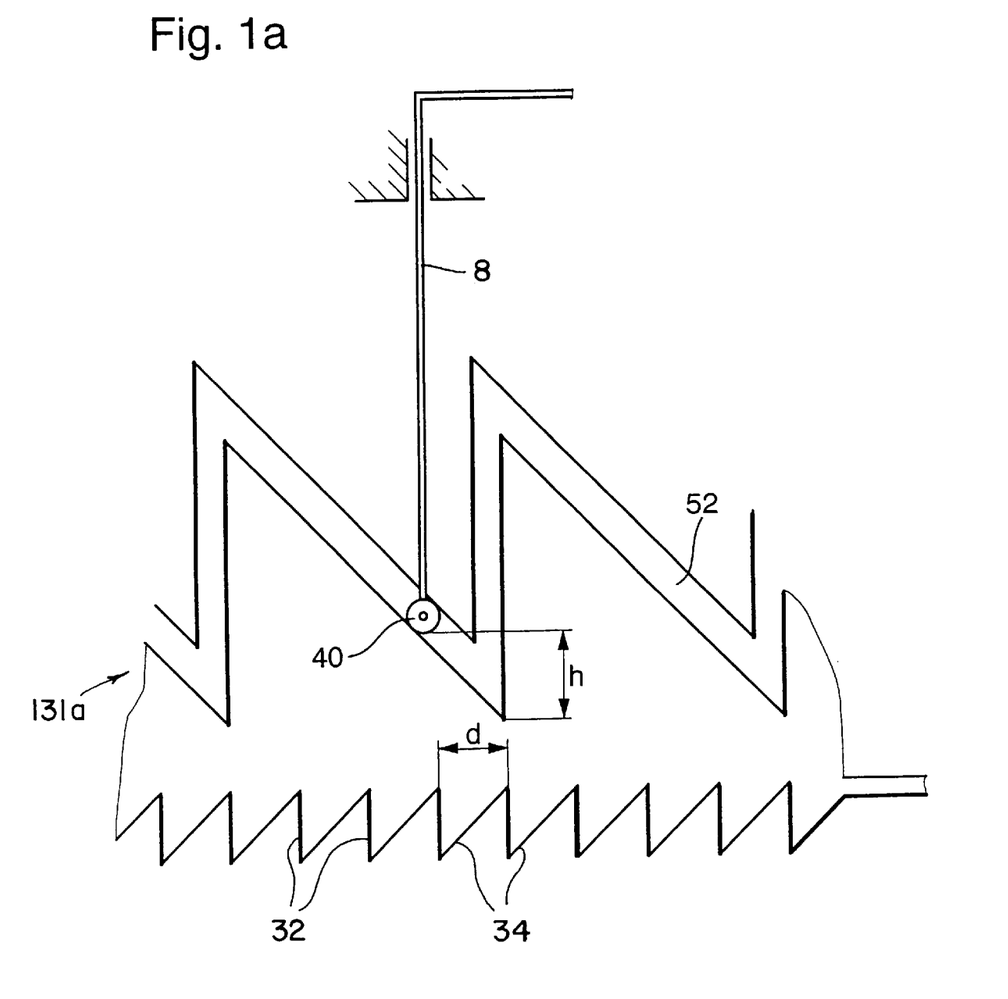
FIG. 1a is an enlarged fragmentary schematic view of a second power train.

The illustrated sawtooth shaped portion 35 of the cam 31a can be replaced with a portion having a groove 52 (FIG. 1a) with a configuration conforming to that of the cam faces 36, 38 and receiving the roller follower 40 or a pin or stud in lieu of such roller follower. The extent h of movement of the roller follower 40 shown in FIG. 1a along the cam groove 52 corresponds to the distance d between two neighboring cam faces 32 of the modified cam 131a. An advantage of the cam 131a of FIG. 1a is that, if the roller follower 40 is adequately held against any movement but longitudinally of the cam groove 52, the spring 42 of FIG. 1 can be dispensed with.

FIG. 1 shows a blank 31 which must be converted into an endless cam (31a) prior to being put to use in the motion transmitting means including the parts 18, 24, 26, 27 and 31a. This endless (cylindrical) cam 31a is indexible about the axis of a shaft 37, and such axis is or can be normal to the direction of reciprocatory movement of the cam 18. The pawl 27 is movable tangentially of the hollow or solid cylindrical body of the endless rotary cam 31a.

FIG. 1 shows that a simplified version of the motion transmitting means can utilize the blank 31 as a substitute for the cam 31a. The blank (cam) 31 is then reciprocable in parallelism with the cam 18 and is confined or constrained to such reciprocatory movement by an extension 44 which is guided in a bearing 44A.

A retaining member 46 (such as a pallet which is biased by a spring 48) ratchets along the teeth of the sawtooth shaped portion 30 of the blank (cam) 31 of FIG. 1 when the pallet of the pawl 27 moves the blank 31 in a direction to the right (as viewed in FIG. 1), i.e., while the carriage 24 is being pushed by the stop 26 of the moving reciprocatory cam 18.

The cam 31a of FIG. 4 is preferred over the blank (cam) 31 of FIG. 1 for a number of reasons. For example, the cam 31a need not be reset but can always be indexed in a single direction, namely while the roller follower 22 tracks the ramp 20 and thereupon the cam face 51, i.e., while the actuator 16 is caused to move the cam 31a or 31 to the right through a distance Hk+n.d. The retainer 46 (not shown in FIG. 4) holds the endless cam 31a against rotation in a clockwise direction when the cam 18 carries out a certain stroke in a direction to the left, i.e., back to the starting position shown in FIGS. 1 and 4.

Each rightward movement of the cam 18 entails a counterclockwise movement of the cam 31a through a distance d which causes the gear selecting member 8 to move through a distance between two neighboring gears of the transmission 6. Repeated back-and-forth movements of the cam 18 are carried out if the cam 31a is to be indexed through a distance 2d, 3d or 4d. The distance 4d equals the distance A, i.e., the maximum possible movement of the gear selecting member 8 and its follower 40 relative to the case of the automated transmission 6.

The number of teeth on the sawtooth shaped portions 30 and 35 can be increased or reduced without departing from the spirit of the invention, as long as the ratio of the number of teeth having cam faces 32, 34 relative to the number of teeth having the cam faces 36, 38 remains unchanged. In FIG. 4, the pawl 27 rides over a single adjacent cam face 34 when the cam 18 is caused to perform a return stroke (to the left) because the pallet of the pawl 27 encounters a single cam face 34 during such return movement of the cam 18. At such time, the cam 31a is held against clockwise rotation under the action of the pallet of the pawl 27 because the sawtooth shaped portion 30 is permanently engaged by the spring-biased retainer 46.

As already pointed out hereinbefore, the dimensions of each cam face 36 are selected in such a way that, when the cam 31a is turned through an angle corresponding to the distance A shown in FIG. 1 (namely through a distance which is required to move the cam 31a through an angle such that a cam face 38 assumes the position previously held by the immediately preceding cam face 38), the gear selecting member 8 completes a movement which is required to shift from one selected gear into another selected gear which is remotest from the one selected gear. When the cam 31a is turned about the axis of the shaft 37 through an angle corresponding to the distance d between two neighboring cam faces 32, the follower 40 is moved along the adjacent cam face 36 through a distance h which causes the gear selecting member 8 to move through the distance h. Since A=4d, the transmission 6 has four gear selecting paths (see G1, G2, G3, G4 in FIG. 2 or 3).

In view of the fact that the retainer 46 and its spring 48 prevent angular movements of the cam 31a in a clockwise direction (as viewed in FIG. 4), the selection of gears must take place in a single direction, i.e., sequentially. For example, if the transmission 6 has gear selecting paths 1-2, 3-4 and 5-R, and if the selecting direction is from the path 1-2 to the path 3-4, thereupon to the path 5-R, and thence again to the path 1-2, a shifting from forward gear 3 into the forward gear 2 necessitates a movement of the gear selecting member 8 from the path 3-4, through the path 5-R and thence into the path 1-2. Once the selection of the forward gear 2 is completed, the actuator 12 causes the member 10 to actually shift the transmission 6 into the selected forward gear 2.

Basically, the operation of the power train embodying the structure of FIG. 1 (but utilizing the unidirectionally indexible endless cylindrical cam 31a of FIG. 4 in lieu of the blank 31 of FIG. 1) is as follows:

When the control circuit 16A causes the actuator 16 to move the cam 18 from the first position of FIG. 1 and in a direction to the right, a movement of the cam 18 through the distance Hk entails a movement of the stop 26 toward the carriage 24 (which was originally held in a position of abutment with the stop 26A) and a displacement of the roller follower 22 by the ramp 20 so that the operating member 14 disengages the clutch 4. A return movement of the cam 18 by the actuator 16 effects a renewed engagement of the clutch 4 while the roller follower 22 rolls along the ramp 20 toward and onto the further cam face 20A of the reciprocatory cam 18 and the stop 26 moves away from the carriage 24 while the stop 26A moves toward the carriage.

If the actuator 16 continues to move the cam 18 in a direction to the right beyond the distance Hk, this entails an advancement of the carriage 24 with the stop (actually pusher) 26. When the carriage 24 covers a distance d, one of the cam faces 36 moves relative to the roller follower 40 through the same distance d and the gear selecting member 8 is moved through a distance h. This causes the shifting member 8 to move from alignment with a preceding shifting path (e.g., 1-2) into alignment with the next (immediately following) shifting path.

The operation of the actuator 12 is synchronized with that of the actuator 16 so that the shifting member 10 is compelled to shift the transmission 6 out of the gear 1 or 2 before the selector 8 has been moved (by the adjacent cam face 36) through the distance h. In other words, the transmission 6 is in neutral while the member 8 covers the distance h from the path 1-2 to the immediately following path (3-4). The actuator 12 is caused to move the shifting member 10 when the gear selecting member 8 reaches the path 3-4 if the transmission 6 is to be shifted into the third gear or into the fourth gear. The control circuit 16A then causes the cam 18 to return to the position of FIG. 1 whereby the clutch 4 is reengaged via ramp 20, follower 22 and operating member 14.

The movements of the cam 18 by way of the actuator 16 can be carried out in the above described manner, i.e., always through a distance d (once the movement through the distance Hk is completed), or in such a way that, subsequent to covering the distance Hk, the cam 18 invariably covers a distance which is a multiple of d, such as n.d (i.e., the maximum distance) when n is a multiple of one and equals the maximum number of shifting paths. Furthermore, n can also equal zero when a shifting operation does not involve a shifting from one path into another path.

Figure 2:
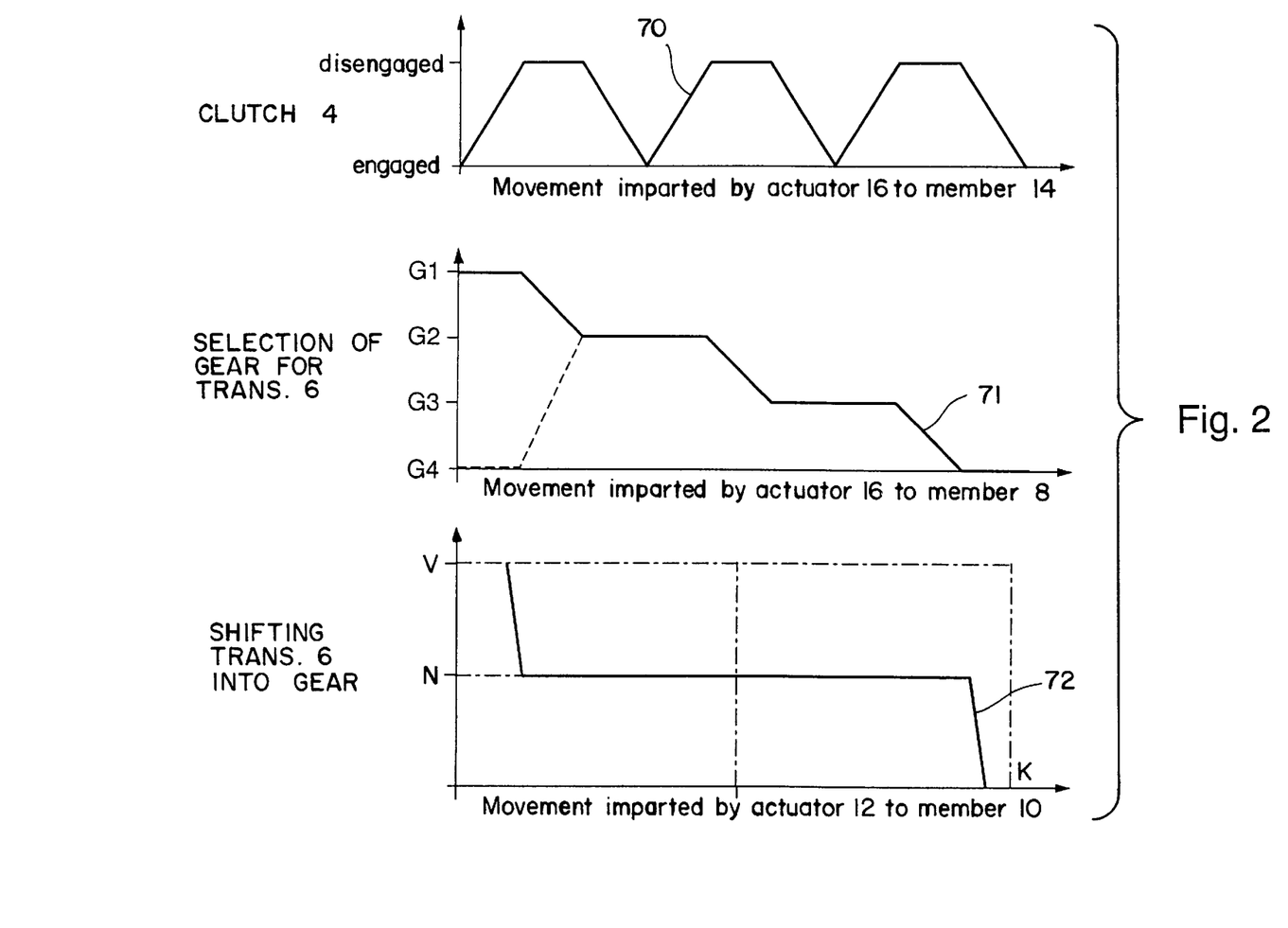
FIG. 2 is a diagram of the various steps involving one mode of operation of the improved power train.

The diagram of FIG. 2 is representative of a first mode of operation of the improved power train. The topmost curve 70 is indicative of movements of the clutch operating member 14, the median curve 71 represents the movements of the gear selecting member 8, and the bottom curve 72 denotes the movements of the gear shifting member 10. The characters G1, G2, G3 and G4 denote the four gear selecting paths, the character V is indicative of the front part of a path, and the character K is indicative of the rear part of a path.

It is assumed that the control circuit 16A is to effect a shifting from the front part of the first path G1 into the rear part K of the fourth path G4. The actuator 16 and the cam 18 are assumed to be designed in such a way that the maximum stroke of the cam 18 equals Hk+d. When the movement of the cam 18 through the distance Hk (and in a direction to the right, as viewed in FIG. 1) is completed, the clutch 4 is disengaged and remains disengaged while the cam 18 continues to move in the same direction through the distance d. This causes the selecting member 8 to move from the gear selecting path G1 into the path G2. The actuator 12 is operated when the clutch 4 is at least substantially disengaged, and this entails a movement of the shifting member 10 from the front path V into neutral gear N.

The cam 18 is thereupon moved back to its starting position but the selecting member 8 remains in the path G2 and the clutch is reengaged. The immediately following next step involves a renewed movement of the cam 18 from the starting position to disengage the clutch 4 via operating member 14, and the member 8 is moved from the path G2 into the path G3 as the cam continues to move beyond the distance Hk. The position of the shifting member 10 remains unchanged, namely in neutral (N). The next cycle involves a renewed movement of the cam 18 from the right-hand end position (through a distance Hk+d from the starting position of FIG. 1) to reengage the clutch 4, and a renewed movement from the starting position of FIG. 1 through the distance Hk+d. This entails a renewed disengagement of the clutch 4 and a movement of the member 8 from the path G3 into the path G4. The actuator 12 then causes the member 10 to move from neutral (N) to the rear position K, and the clutch 4 is thereupon reengaged as soon as the cam 18 returns to its starting position.

The just described mode of operating the automated clutch 4 and the automated transmission 6 renders it possible to employ a very simple or a relatively simple actuator 16 because the stroke of the cam 18 is always the same, namely Hk+d. The configuration of the curve 72 in the bottom part of FIG. 2 is a function of time even though the movements of the shifting member 10 under the command of the associated actor 12 are entirely independent of the clutch operating and gear selecting steps.

Figure 3:
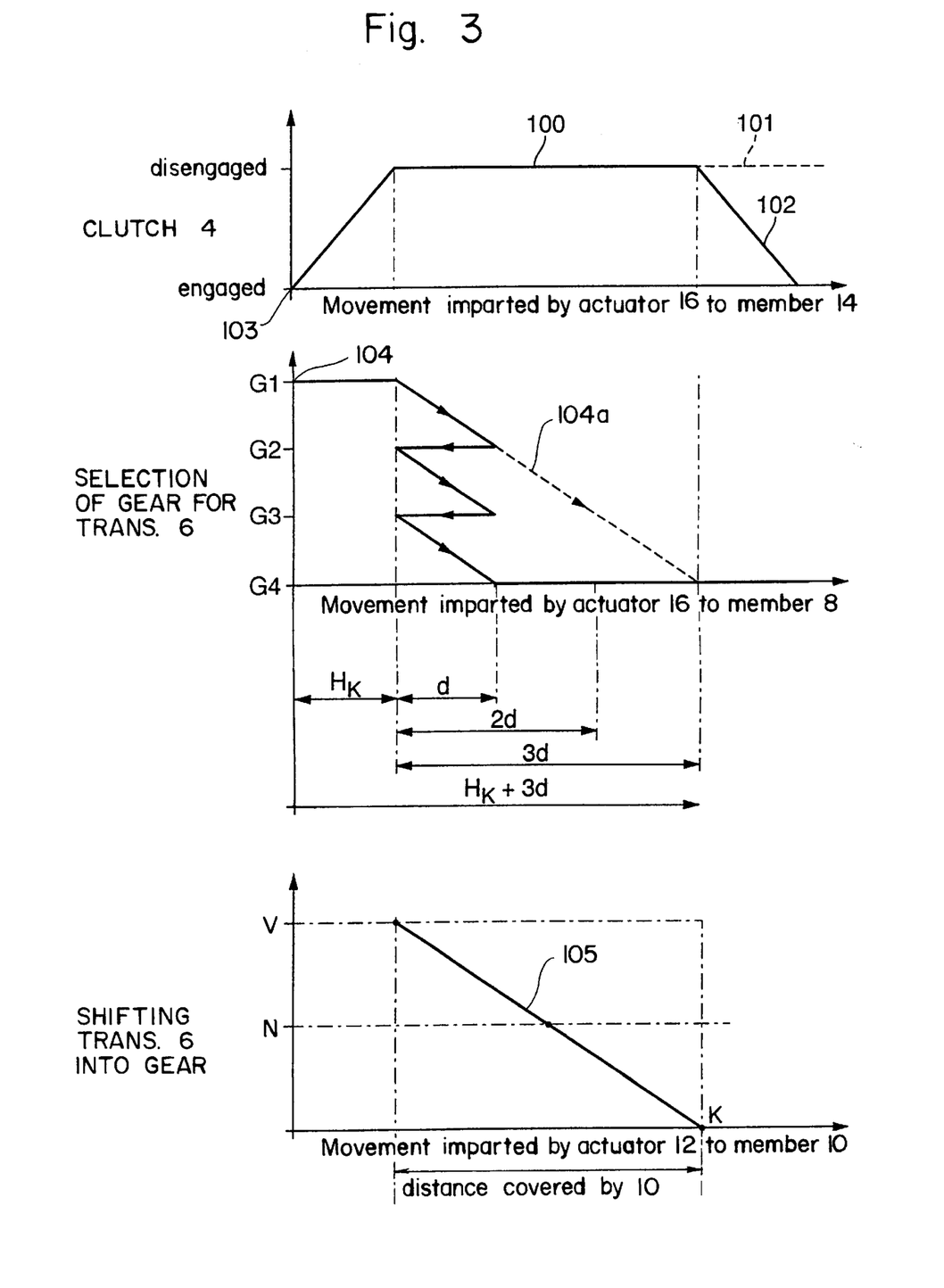
FIG. 3 is a diagram showing the steps of a second mode of operation of the power train.

The diagram of FIG. 3 is representative of a gear selecting and shifting and synchronized clutch engaging/disengaging operation. The topmost curve 100 denotes the movements of the clutch operating member 14, the median curve 104 represents the movements of the gear selecting member 8, and the bottom curve 105 represents the movements of the gear shifting member 10, always as a function of the stroke of the corresponding actuator. Thus, the curve 105 represents the movements of the gear shifting member 10 in dependency upon the stroke of the corresponding actuator 12, i.e., the scale of that portion of the diagram of FIG. 3 which shows the curve 105 need not correspond to the scale of the upper part of the diagram wherein the curves 100 and 104 are dependent upon the strokes of their common actuator 16. Due to the utilization of two discrete actuators 12, 16 (such actuators can be operated independently of each other), there is no binding relationship between the curves 100, 104 on the one hand, and the curve 105 on the other hand.

The broken-line curve 101 in the upper part of the diagram of FIG. 3 is also indicative of certain stages of operation of the transmission 6. For example, the reciprocable elongated cam 18 of FIGS. 1 and 4 can be replaced with a disc-shaped cam so that it is not necessary to change the direction of movement of the disc-shaped cam. The curves 100 and 101 denote the operation of the clutch in the course of a periodically recurring coupling with the cam 31a during a first full revolution of the disc-shaped cam replacing the cam 18, and the curve 102 denotes the movements of the clutch operating member 14 upon completion of the first revolution. The curve 102 merges into the curve 100, as at 103, after a full revolution of the disc-shaped cam replacing the illustrated cam 18.

It is now assumed that the transmission, controlled by a gear selecting member the movements of which are denoted by the curve 104 and a shifting member the movements of which are denoted by the curve 105, is to be shifted from the front position V in the first path G1 into a gear in the rear portion K of the gear path G4. The cam 18 or its circular disc-shaped equivalent is first advanced through the distance Hk to disengage the clutch 4 when the follower 22 of FIG. 1 is contacted by the cam face 51. The gear shifting member 10 is moved by the actuator 12 when the clutch 4 is at least substantially disengaged. The actuator 12 receives signals from a second control circuit (not shown) corresponding to the control circuit 16A for the actuator 16. Such movement of the member 10 results in advancement from the front portion (V) of the gear path G1 into neutral (N).

When the cam 18 advances beyond the distance Hk, namely through an additional distance d, the clutch 4 remains disengaged and the gear selecting member 8 moves from the path G1 into the path G2. The cam 18 is then moved backwards (i.e., in a direction to the left, as viewed in FIG. 1 or 4) through the distance d while the retainer 46 holds the cam 31a against clockwise movement (as viewed in FIG. 4) and the pallet of the pawl 27 rides over one tooth (32, 34) of the sawtooth shaped portion 30. The next step involves a renewed movement of the cam 18 in a direction to the right (as viewed in FIG. 1 or 4) through a distance d. The clutch 4 continues to remain disengaged while the gear selecting member 8 moves from the path G2 into the path G3 (this is indicated in FIG. 3 by a broken line, as at 104a). The same sequence of steps is repeated once more so that the member 8 leaves the path G3 and enters the path G4. The next steps involve a movement of the member 10 from neutral position (N) to the rear position K, and a reengagement of the clutch 4 as a result of return movement of the cam 18 and the follower 22 to the starting positions shown in FIGS. 1 and 4.

As also shown in the diagram of FIG. 3, the overall movement of the cam 18 can cover a distance Hk+3d, i.e., the member 8 can move from the path G1 directly to the path G4 as soon as the clutch 4 is disengaged. The shifting member 10 is then moved from the neutral position N to the rear position K and, when the cam 18 moves back to the starting position of FIG. 1 or 4, the pallet of the pawl 27 rides over three successive teeth of the sawtooth shaped portion 30 before the clutch 4 is reengaged as the follower 22 rides along the ramp 20 from the cam face 51 toward and onto the cam face 20A.

It is also possible to complete the shifting into a different gear in two stages, e.g., by first moving the cam 18 through the distance Hk+2d and thereupon backwards through a distance d, and thereafter forward through a required distance (d or 2d).

The just described automated shiftings of the transmission 6 into different gears can be readily achieved by utilizing an actuator 16 which includes or constitutes an electric stepping motor. The distance Hk is a whole multiple of a distance d, and d is the distance which the cam 31a must cover in order to effect a movement of the shifting member 8 through a distance matching that between two neighboring paths (such as G1, G2 or G2, G3, etc.).

The control circuit 16A can be readily selected and designed with a view to impart to the actuator 16 a required flexibility, e.g., to shift the transmission 6 directly between any selected pairs of gears, and each such shifting entails a disengagement and a reengagement of the clutch 4.

It is further clear that, in lieu of utilizing an actuator 16 which constitutes an electric motor (such as the aforementioned stepping motor), it is also possible to employ an actuator 16 which includes or constitutes one or more fluid-operated motors (e.g., one or more single-acting or double-acting hydraulic cylinder and piston units) which can effect a continuous movement or several stepwise movements of the cam 18.

The safety of operation of the improved power train can be enhanced by utilizing one or more sensors (e.g., adjacent the ramp 20) which transmit signals to the control circuit 16A and permit an operation of the actuator 16 (or its equivalent or equivalents) only when the automated clutch 4 is indeed disengaged, either entirely or at least substantially.

It is further clear that the power train of the present invention can employ an automated transmission of the type wherein the reverse gear can be shifted into along a separate path not common to any of the forward gears, or an automatic transmission wherein the path for shifting into reverse gear is common to the path for shifting into one of the forward gears (e.g., the forward gear 5) but a separate or discrete barrier must be removed or deactivated or activated prior to permitting a shifting of such transmission into neutral.

One additional modification can be arrived at by moving the gear selecting member 8 while the cam 18 is moved to disengage the clutch 4, i.e., while the follower 22 tracks the ramp 20, and to cause the pawl 27 to ratchet over one or more adjacent teeth of the sawtooth shaped portion 30 of the cam 31a during a following movement of the ramp 20 along the follower 22 but in the opposite direction to engage the clutch.

Still further, it is possible to design the cams 18 and 31a in such a way that the clutch 4 is being disengaged or engaged while the follower 22 tracks the cam face 51 and that the clutch remains disengaged while the follower 22 tracks the ramp 20.

In accordance with still another modification, the single actuator 16 can be replaced with two discrete actuators (such as two fluid-operated cylinder and piston units) one of which serves to move the cam 18 in a direction to the right, as viewed in FIG. 1 (i.e., to disengage the clutch 4) and the other of which serves to move the cam 18 in a direction to the left (i.e., to reengage the clutch). Such arrangement renders it possible to move the cam 18 by means of relatively simple (unidirectional) actuators instead of a more complex reversible actuator 16.

An advantage of the structure which is shown in FIG. 1 is that the actuator 16 can be utilized to change the condition (extent of engagement or disengagement) of the clutch 4 (by way of the operating member 14) and to select the gear of the transmission 6 (by way of the member 8). The member 14 is set up to change the condition of the clutch 4 (or an equivalent automated or automatic clutch) prior as well as subsequent to each selection of a gear by the member 8.

An important advantage of the improved power train is that, due to the utilization of a common actuator 16 for the operating member 14 of the clutch 4 and the gear selecting member 8 of the transmission 6, one can reliably ensure that the shifting into a different gear is invariably preceded by a disengagement of the clutch and a completion of shifting into a selected gear is invariably followed by a reengagement of the clutch. Moreover, the utilization of a common actuator for the clutch and for the shifting of the transmission into selected gears contributes to a reduction of the cost of the power train and to a desirable reduction of space requirements. Furthermore, this entails a saving of a control circuit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of assembling and operating automated power trains for use in motor vehicles and, therefore, such adaptations should and are intended to be comprehended within the meaning and range of equivalence of the appended claims.

What is claimed is:

1. A power train comprising a variable-speed transmission shiftable into a plurality of different gears and having mobile means for selecting the gears and mobile means for shifting into and from selected gears; a prime mover; a clutch operating between said prime mover and an input element of said transmission and having engaged and disengaged conditions, said clutch including mobile operating means for selecting the condition thereof; and regulating means for initiating and controlling the movements of said selecting, shifting and operating means, said regulating means comprising a first actuator for said shifting means, a second actuator common to said selecting and operating means, and means for transmitting motion from said second actuator to said selecting and operating means, said motion transmitting means being movable from a first position to thus disengage said clutch by way of said operating means, through an intermediate position to thus move said selecting means, and to a second position to thus engage said clutch by way of said operating means, said motion transmitting means comprising an essentially endless cam having cam faces and said selecting means having follower means arranged to track a selected one of said cam faces.

2. The power train of claim 1, wherein said motion transmitting means further comprises a second cam movable along a predetermined path from said first position to thus disengage said clutch by way of said operating means, through said intermediate position to thus effect a movement of said selecting means by way of said endless cam, and to said second position to thus engage said clutch, said second position at least substantially coinciding with said first position and said second cam being movable relative to said endless cam from said first and to said second positions thereof, the condition of said clutch remaining unchanged during movement of said second cam through said intermediate position.

3. The power train of claim 2, wherein the movements of said second cam from said first position and through said intermediate position take place in a first direction and the movement of said second cam to said second position takes place in a second direction at least substantially counter to said first direction.

4. The power train of claim 3, wherein said second cam has a ramp and said operating means has a follower which tracks said ramp during movements of said second cam from said first position and to said second position.

5. The power train of claim 3, wherein said motion transmitting means further comprises means for coupling said endless cam to said second cam during movement of said second cam through said intermediate position.

6. The power train of claim 5, wherein said cam faces of said endless cam comprise a plurality of first cam faces and a plurality of second cam faces, said coupling means cooperating with said first cam faces to move said endless cam during movement of said second cam through said intermediate position and said follower means tracking said second cam faces to move said selecting means during movement of said second cam through said intermediate position.

7. The power train of claim 6, wherein said endless cam comprises a first substantially sawtooth shaped portion provided with said first cam faces and a second substantially sawtooth shaped portion provided with said second cam faces.

8. The power train of claim 6, wherein the shifting of said transmission into any one of said plurality of different gears necessitates movements of said selecting means to several positions, each of said second cam faces being dimensioned and configured to effect a movement of said follower means through distances sufficient to move said selecting means to any one of said several positions.

9. The power train of claim 6, wherein the shifting of said transmission into any one of said plurality of different gears necessitates movements of said selecting means through predetermined distances to several positions, said first cam faces being dimensioned and configured to effect a movement of said selecting means through fractions of said predetermined distances.

10. The power train of claim 6, further comprising a stop arranged to limit the movements of said endless cam to movements in one of said directions.

11. The power train of claim 5, wherein said coupling means comprises a carriage movable with and relative to said second cam and a spring-biased pawl mounted on said carriage and engaging a substantially sawtooth shaped portion of said endless cam.

12. The power train of claim 2, wherein said second actuator is arranged to move said selecting means to a position corresponding to the selection of any one of said plurality of different gears from a previously selected gear to an adjoining gear during movement of said motion transmitting means through said intermediate position.

13. The power train of claim 2, wherein said second actuator is arranged to move said selecting means to a position corresponding to the selection of any one of said plurality of different gears during movement of said motion transmitting means through said intermediate position.

14. The power train of claim 1, wherein at least one of said actuators comprises an electric motor.

15. The power train of claim 14, wherein said motor is a stepping motor.

16. The power train of claim 1, wherein at least one of said actuators comprises a fluid-operated motor.

17. The power train of claim 1, wherein said prime mover comprises a combustion engine.

18. A method of operating a clutch and a transmission in a power train wherein the transmission is shiftable into and from a plurality of different gears and has mobile means for selecting the gears and mobile means for shifting into and from selected gears, wherein the transmission receives torque from a prime mover by way of the clutch and the clutch has engaged and disengaged conditions and mobile operating means for selecting the condition thereof, and wherein a regulating means serves to initiate and control the movements of the selecting, shifting and operating means and has a first actuator for the shifting means, a second actuator for the selecting and operating means, and means for transmitting motion from the second actuator to the selecting and operating means, comprising the steps of disengaging the clutch by way of the second actuator and the motion transmitting means prior to each selection of a gear by the second actuator and the motion transmitting means; engaging the clutch by way of the second actuator and the operating means upon each selection of a gear by the second actuator and the motion transmitting means; shifting the transmission into a selected gear by way of the first actuator and the shifting means; and providing the regulating means with at least one essentially endless cam for carrying out a gear selecting operation.

19. The method of claim 18 for operating a clutch and a transmission wherein the selection of any one of said different gears involves movements of the selecting means through predetermined distances between a plurality of different positions each denoting the selection of a particular one of said plurality of gears, each selection of a gear by the second actuator and the motion transmitting means including moving the selecting means through one of said predetermined distances between successive movements of the operating means.

20. The method of claim 18 for operating a clutch and a transmission wherein the selection of any one of said different gears involves movements of the selecting means through predetermined distances between a plurality of different positions each denoting the selection of a particular one of said plurality of gears, each selection of a gear by the second actuator and the motion transmitting means including moving the selecting means through a multiple of one of said predetermined distances between successive movements of the operating means.

* * * * *